United States Patent
Reed et al.

(10) Patent No.: US 6,308,671 B1
(45) Date of Patent: Oct. 30, 2001

(54) METHOD OF INCREASING TORQUE AND/OR REDUCING EMISSIONS BY VARYING THE TIMING OF INTAKE AND/OR EXHAUST VALVES

(75) Inventors: Dennis C. Reed, Plymouth; Martin Muller, Ann Arbor; Edward George Himes, Novi, all of MI (US); Bart Hubert Schreurs, Athus (BE); Joon-Ho Yoo, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/658,596

(22) Filed: Sep. 11, 2000

(51) Int. Cl.$^7$ .................................. F01L 1/34; F02D 9/10
(52) U.S. Cl. ..................... 123/90.15; 123/399; 123/478
(58) Field of Search ......................... 123/90.15, 90.16, 123/90.17, 90.18, 90.31, 399, 478; 701/103, 104

(56) References Cited

U.S. PATENT DOCUMENTS 6,000,375 * 12/1999 Isobe ................................. 123/322
6,006,725 * 12/1999 Stefanopoulou et al. ........... 123/399
6,182,636 * 2/2001 Russell et al. ..................... 123/399

* cited by examiner

*Primary Examiner*—Weilun Lo
(74) *Attorney, Agent, or Firm*—Vincent A. Cichosz

(57) ABSTRACT

A method of improving the operating characteristics of an internal combustion engine equipped with electronic throttle control employs variable cam timing to vary the phasing of the intake valves and/or exhaust valves so as to achieve lower feed gas emissions and improved fuel economy while delivering as closely as possible the desired torque. The method can be implemented using a fuel-lead strategy or an air-lead strategy. Whenever a change is requested in the amount of torque, the method responds by adjusting the amount of fuel flow, the spark timing, the position of the throttle and/or the positions of the intake valves and/or the exhaust valves so as to deliver the desired torque. The method adjusts those operating parameters in a way that improves the ability of the engine to deliver the desired torque, produce less feed gas emissions, idle more stably, and consume less fuel.

10 Claims, 8 Drawing Sheets

FIGURE 6

| MAP/MEP/%TORQUE | 800 RPM | 1200 RPM | 1600 RPM | 2000 RPM | 2400 RPM | 2800 RPM | 3200 RPM | 3600 RPM |
|---|---|---|---|---|---|---|---|---|
| 20/0/0 | 0 | 0 | 0 | 10 | 20 | 27 | 10 | 20 |
| 30/200/12.5 | 0 | 0 | 0 | 15 | 20 | 33 | 10 | 20 |
| 40/400/25 | 0 | 0 | 0 | 20 | 25 | 35 | 10 | 20 |
| 50/600/37.5 | 8 | 12 | 20 | 20 | 30 | 40 | 30 | 20 |
| 60/800/50 | 10 | 18 | 32 | 36 | 40 | 44 | 46 | 40 |
| 70/1000/62.5 | 12 | 20 | 35 | 40 | 40 | 40 | 40 | 20 |
| 80/1200/75 | 30 | 30 | 40 | 50 | 40 | 42 | 45 | 20 |
| 90/1400/87.5 | 40 | 40 | 40 | 50 | 40 | 40 | 43 | 20 |
| 100/1600/100 | 50 | 40 | 40 | 50 | 40 | 37 | 41 | 20 |

| MAP/MEP/%TORQUE | 4000 RPM | 4400 RPM | 4800 RPM | 5200 RPM | 5600 RPM | 6000 RPM | 6400 RPM |
|---|---|---|---|---|---|---|---|
| 20/0/0 | 15 | 10 | 10 | 7 | 5 | 0 | 0 |
| 30/200/12.5 | 15 | 10 | 10 | 7 | 5 | 0 | 0 |
| 40/400/25 | 15 | 10 | 10 | 7 | 5 | 0 | 0 |
| 50/600/37.5 | 15 | 10 | 10 | 7 | 5 | 0 | 0 |
| 60/800/50 | 15 | 10 | 10 | 7 | 5 | 0 | 0 |
| 70/1000/62.5 | 15 | 0 | 0 | 0 | 0 | 0 | 0 |
| 80/1200/75 | 15 | 0 | 0 | 0 | 0 | 0 | 0 |
| 90/1400/87.5 | 15 | 0 | 0 | 0 | 0 | 0 | 0 |
| 100/1600/100 | 15 | 0 | 0 | 0 | 0 | 0 | 0 |

METHOD OF INCREASING TORQUE AND/ OR REDUCING EMISSIONS BY VARYING THE TIMING OF INTAKE AND/OR EXHAUST VALVES

FIELD OF THE INVENTION

The present invention relates, in general, to an internal combustion engine of the type equipped with an electronic throttle control system and a variable valve timing mechanism(s), and of the type controlled by a torque based management system. More particularly, the invention pertains to a method of increasing engine torque and/or of reducing engine emissions by varying the phasing of either the intake valves or the exhaust valves or both.

BACKGROUND OF THE INVENTION

The following background information is provided to assist the reader to understand one of the many environments in which the invention will typically be used. Upon reading this document, the reader will appreciate that the invention may also be applied or adapted to environments other than that described below.

FIG. 1 illustrates one cylinder of an electronically controlled multi-cylinder engine that is equipped with a mechanism capable of varying the timing of the opening and closing of the intake and exhaust valves. While the engine 1 is operating, air at atmospheric pressure is drawn into an inlet 2 through a filter 3 and into an intake duct 4. The incoming air then flows into a throttle body 5 in which is disposed a throttle valve 6. The throttle valve 6 typically takes the form of a rotatable plate.

Controlled by an electronic throttle control (ETC) system, the throttle plate 6 has its position adjusted regularly to allow an amount of air appropriate to present conditions to pass through the throttle body 5 and thereafter into an intake manifold 7. The throttle control system typically features a pedal sensor 8, a throttle position sensor (TPS) 9, a motor 10 and an electronic control module (ECM) 11. The pedal sensor 8 enables the ECM 11 to monitor the position of the accelerator pedal, and thus to determine whether the driver wants the vehicle to maintain, increase or decrease torque. The TPS sensor 9 enables the ECM 11 to monitor the angular position that the throttle plate 6 occupies in the throttle body 5. Pursuant to prior art algorithms, the ECM 11 uses the input from these sensors, as well as other sensors, such as those shown in FIG. 2, to control the engine 1 so that it delivers the desired torque according to the conditions under which the vehicle is operating. In doing so, the ECM 11 controls via motor 10 the position of the throttle plate 6, and thus the quantity of air that is drawn into the intake manifold 7.

From the intake manifold 7 the incoming air then passes to an intake duct 12 that leads to the cylinder 13. Meanwhile, fuel from a fuel tank 14 is pumped via a pump 15 through a pipe 16 to a fuel injector 17. According to known practice, the ECM 11 uses data from several sensors to calculate the injector pulse width, i.e., the electrical signal that the ECM 11 uses to activate the fuel injector 17 for a time appropriate to current conditions. Activated via a drive circuit, the fuel injector 17 injects the precise amount of fuel into the intake duct 12. There, the fuel mixes with the inlet air coming from the intake manifold 7.

As noted in greater detail infra, a cam timing mechanism drives the intake valve 18 to the open position in timed relationship with the intake cycle of cylinder 13. During the intake cycle, a low pressure condition develops within the combustion chamber 19 due to the downward movement of a piston 20 within the cylinder 13. The low pressure draws the fuel-air mixture from the intake duct 12 past the intake valve 18 and into the combustion chamber 19. For the subsequent compression cycle, the action of the cam timing mechanism(s), as noted infra, closes the intake and exhaust valves 18 and 21 at the top of the cylinder 13. During the compression cycle itself, as is well known, the upward movement of the piston 20 compresses the air-fuel mixture in the combustion chamber 19 of the cylinder 13.

During the combustion cycle, the fuel-air mixture is ignited and exploded to produce power. Operating according to the spark sequence controlled by an electronic spark timing system, the ECM 11 causes the air-fuel mixture to be ignited in the combustion chamber 19. More specifically, the combustion cycle is initiated, at the appropriate time, by a spark driven across the spaced electrodes of a spark plug 22. The explosive force of the combustion drives the piston 20 downward within cylinder 13. The downward thrust of the piston 20 is imparted via connecting rods 23 as a torque upon a crankshaft 24 of the engine 1. Combined with the torque it receives from the other pistons in the engine 1, the crankshaft 24 drives the wheels and the accessory loads, etc., of the motor vehicle, as is generally understood in the art.

For the exhaust cycle, a cam timing mechanism drives the exhaust valve 21, at the appropriate time, to the open position. During the exhaust cycle, the upward movement of the piston 20 forces the exhaust gases produced by combustion past the exhaust valve 21 and into an exhaust manifold 25. An exhaust pipe 26 then channels the exhaust gases to a catalytic converter 27. A catalyst within the converter 27 aids the oxidization of unburned constituents, such as carbon monoxide (CO) and hydrocarbons (HC), and the reduction of nitrogen oxides ($NO_x$). From the converter 27, the purified exhaust gases are conveyed typically through a muffler and then through a tail pipe to atmosphere.

The ECM 11 monitors and controls the operation of the engine 1 through many data sensors, switches and control devices, some of which are shown in FIGS. 1 and 2. In addition to the pedal and TPS sensors 8 and 9, the data sensors include an intake air temperature (IAT) sensor 28, a coolant temperature sensor (CTS) 29, a manifold absolute pressure (MAP) sensor 30, a vehicle speed sensor (VSS) 31, an oxygen ($O_2$) sensor 32, and an engine speed (RPM) sensor 33. On some vehicles, additional data sensors are used. These include a wide range air-fuel (WRAF) sensor 34, a barometric pressure (BARO) sensor 35, and a mass air flow (MAF) sensor 36. The devices and subsystems that the ECM 11 controls, include the electronic throttle control system, the electronic spark timing system, the fuel injection system and the cam timing mechanisms.

The data sensors generate electrical signals, typically in analog form, indicative of the parameters they are intended to measure. The IAT sensor 28 typically measures the temperature of the air in the inlet 2 of the engine 1. The CTS sensor 29 senses the temperature of the coolant that flows in channels 37 around the cylinders to keep the engine cool. The MAP sensor 30 measures the absolute air pressure in the intake manifold 7. The VSS, sensor 31 generates a pulse representing the actual speed of the vehicle. The $O_2$ sensor 32 is typically mounted to the exhaust system downstream of the converter 27 so that its head lies exposed to the stream of exhaust gases produced by the engine 1. It senses the free oxygen concentration in the exhaust gases, and conveys a corresponding signal to the ECM 11. Typically exposed to the exhaust gases upstream of the converter 27, the WRAF sensor 34 measures the air-fuel ratio. It is used on some vehicles to measure directly the ratio of air to fuel for purposes of controlling the delivery of fuel to the engine 1. The ECM 11 uses the signals from the $O_2$ and WRAF sensors 32 and 34 to control more precisely the fuel-air mixture to achieve stoichiometry. This correction process is known as closed loop operation.

On vehicles equipped with BARO and MAF sensors, the BARO sensor 35 measures the pressure of the ambient air and provides data to the ECM 11 as to pressure changes due to altitude and weather. The MAF sensor 36 measures the rate at which the air mass flows into the intake manifold 7. For vehicles not equipped with a BARO sensor 35, the ECM 11 is programmed to estimate the barometric pressure using data from various other sensors according to well-known practice. For vehicles not equipped with a MAF sensor 36, the ECM 11 estimates the air mass flow rate using data from the various other sensors, as is also known in the art.

The analog signals generated by the data sensors are conveyed to the ECM 11 where an A/D converter 40 converts them into digital signals. This conversion is necessary because the central processing unit (CPU) 41 of the ECM 11 can only manipulate digital information. Along with the input received by the interface (I/F) 42, the digital sensor data is conveyed to input registers in the ECM 11. Using the data it reads from the registers, the CPU 41 not only performs the mathematical computations and logic functions necessary to calculate inter alia the spark timing, the cam timing and the proper fuel-air mixture, but also provides control signals through drive circuits 43–47, The CPU 41 performs all of its functions according to the programming code stored in its associated memory devices. The memory devices include random access memory (RAM) 48 and read only memory (ROM) 49 inclusive of programmable ROM (PROM). The CPU 41 uses RAM 48 to temporarily store information such as the data received from the data sensors, the diagnostic codes and the results of its calculations. The ROM 49 is where the calibration data and fuel delivery algorithms are typically stored along with various lookup tables and control algorithms that collectively constitute the programming code. The elements in the ECM 11 are connected to one another through a system bus 50 containing address, data and control buses.

Used primarily to maintain the engine 1 at idle, the idle speed control (ISC) system includes the ECM 11 and an idle air control (IAC) valve 51. The IAC valve 51 is situated in a flow path parallel to that through the throttle body 5. Upon closure of the throttle plate 6 and feedback from the VSS sensor 31 indicating the vehicle has stopped, the ISC system compares the actual engine speed with a target engine speed it derives according to known practice. Based on the difference between the target and actual values, the ISC system controls the IAC valve 51 via drive circuit 43 so as to adjust the rate at which air flows into the engine 1 and thereby attain the target idle speed.

The electronic spark timing (EST) system includes the ECM 11, the RPM sensor 33 and a distributor module 55. The RPM sensor 33 generates a pulse for every 30 degrees that the crankshaft 24 rotates, thereby providing a measure of the speed, or revolutions per minute (rpm), at which the engine 1 is operating. Through the data sensors, the ECM 11 monitors the speed and other operating conditions of the engine 1, and, from those parameters, calculates the proper spark timing. According to the spark timing sequence, the ECM 11 then directs the distributor module 55 via drive circuit 44 to distribute to each of the spark plugs 22, at the appropriate time, the energy required to achieve combustion.

The fuel injection system includes the ECM 11 and the fuel injector 17. Operating according to known principles, the ECM 11 uses data from several sensors to calculate the target air-fuel ratio. The mass of intake air per engine revolution is calculated from the mass flow rate of intake air measured by the MAF sensor 36 and the engine speed detected by the RPM sensor 33. Alternatively, it may also be estimated using data from other sensors, such as the MAP sensor 30 and the RPM sensor 33. Using the mass of intake air per engine revolution, the ECM 11 then determines the injector pulse width warranted by the current operating conditions. The ECM 11 continually adjusts the injector pulse width to correct for changes in various parameters, such as in the readings taken from the TPS, IAT, $O_2$ and WRAF sensors, so as to maintain as closely as possible the target air-fuel ratio. At a given angle in the operational cycle of the crankshaft 24, the ECM 11 then directs drive circuit 45 to inject fuel from the fuel injector 17 for the time dictated by the injector pulse width.

Most four cycle engines are designed so that the intake and exhaust valves operate (i.e., open and close) in a fixed angular relationship to the angular position of the crankshaft. Many engines use only a single camshaft to control the opening and closing of the intake and exhaust valves. The newer, more advanced engines often use a dual cam arrangement, i.e., one camshaft to control the open/close timing of the intake valves and another camshaft to govern the open/close timing of the exhaust valves. In either case, each valve is biased by a spring to the closed position. Affixed to the camshaft(s) are as many cams as there are valves, with the cams for the intake valves being oriented at one angle and the cams for the exhaust valves being oriented at another angle. Because a camshaft rotates at half the speed of the crankshaft, each intake cam causes its corresponding intake valve to be open (against the bias of the spring) and closed at fixed intervals during the operational cycle of the crankshaft. Similarly, each exhaust cam causes its corresponding exhaust valve to be open and closed at fixed intervals.

The term "standard cam timing" refers to the opening and closing of the intake and/or exhaust valves at such fixed intervals. In engines that employ standard cam timing, a compromise must be reached between how smooth will the engine run at idle, how much torque will it be able to deliver at medium to high speeds, the toxicity of its emissions, aid how much fuel will the engine consume. It involves a decision as to when and how long the intake and exhaust valves should be open at the same time (i.e., valve overlap). The amount and phasing of valve overlap is a trade-off between stable idling and the amount of power that will be available at medium to high speeds. It also is a trade-off between engine performance, emissions and fuel economy.

The automotive industry is now investigating the use of variable cam timing (VCT) schemes to improve the overall performance of an engine without the strict compromises required by standard cam timing techniques. VCT allows the timing of the camshafts, and thus the opening and closing of the valves, to be optimized over a wider range of operating conditions. It offers the possibility of improved performance at medium to full loads coupled with reduced emissions and improvements in fuel economy.

Referring to FIG. 1, the opening and closing of intake valve 18 is controlled by a cam 70 attached to an intake camshaft 71. A cam 80 attached to a camshaft 81 likewise controls the opening and closing of exhaust valve 21. As the pistons reciprocate within their respective cylinders, the torque they impart to the crankshaft 24 via the connecting rods 23 also drives a timing pulley 60. Each camshaft at its end also has a pulley, with camshaft 71 having timing pulley 61 and camshaft 81 having timing pulley 62. A timing belt 63 connects the timing pullers 60, 61 and 62. Consequently, as the crankshaft 24 rotates, it also drives the camshafts 71 and 81, with the cams 70 and 80 thereon opening and closing the intake and exhaust valves 18 and 21 at predetermined angles in the operational cycle of the crankshaft 24. A crankshaft sensor 56 generates a set number of pulses (e.g., 58 pulses) for each rotation of the crankshaft 2,4. Similarly, there are two camshaft sensors 57 and 58. Each camshaft sensor 57 and 58 generates a set number of pulses (e.g., 4 pulses) for each rotation of its respective camshaft 71 and 81.

The dual cam engine shown in FIG. 1 has two continuously variable cam timing mechanisms 72 and 82, one for the intake valves and the other for the exhaust valves. Controlled by the ECM 11, each VCT mechanism enables its respective camshaft to be phase-shifted relative to the crankshaft 24 as a function of the conditions under which the engine 1 is operating. Also referred to as cam phasers, VCT mechanisms take a variety of forms such as the vane type or helical gear type cam phasers. The latter is discussed below for illustrative purposes.

Situated between the camshaft 71 and the timing pulley 61, the intake VCT mechanism 72 turns the camshaft 71 and timing pulley 61 relative to each other. More specifically, the intake cam phaser 72 uses the camshaft 71 and timing pulley 61 as external gears and interconnects them via an intermediate helical gear. Through drive circuit 46, the ECM 11 controls a valve 73 that affects the hydraulic pressure acting upon the helical gear. It also uses feedback from sensors 56 and 57 to monitor the angular relationship between the crankshaft 24 and the intake camshaft 71. By changing the hydraulic pressure via valve 73, the ECM 11 can move the helical gear axially, and thus alter the angular relationship between the intake camshaft 71 and the timing pulley 61 as well as the crankshaft 24. In doing so, the ECM 11 can adjust the open/close timing of the intake valve 18.

The exhaust VCT mechanism 82 is situated between the camshaft 81 and the timing pulley 62. Like the intake cam phaser 72, the exhaust cam phaser 82 uses the camshaft 81 and timing pulley 62 as external gears and interconnects them via an intermediate helical gear. Through drive circuit 47, the ECM 11 controls a valve 83 that affects the hydraulic pressure acting upon this helical gear. It also uses feedback from sensors 56 and 58 to monitor the angular relationship between the crankshaft 24 and the exhaust camshaft 81. By changing the hydraulic pressure via valve 83, the ECM 11 can move this helical gear axially, and thus alter the angular relationship between the exhaust camshaft 81 and the timing pulley 62 as well as the crankshaft 24. In doing so, the ECM 11 can adjust the open/close timing of the exhaust valve 21.

Using VCT mechanisms, the open/close timing of the intake and exhaust valves 18 and 21 can be optimized to improve the overall performance of the engine 1. In dual overhead cam (DOHC) engines, there are four possible types of VCT: (1) phasing only the intake cam (Intake Only); (2) phasing only the exhaust cam (Exhaust Only); (3) phasing the intake and exhaust cams equally (Dual Equal); and (4) phasing the intake and exhaust cams independently (Dual Independent). The Dual Equal strategy is also applicable to single overhead cam (SOHC) engines.

It is well known that use of a VCT mechanism on only the intake camshaft 71 improves engine operation. This involves varying the open/close timing of the intake valve 18, as compared to standard cam timing, when the engine 1 is operating at part load. For example, by advancing the opening of the intake valve 18, the valve overlap is extended into the exhaust stroke. This means that the intake valve 18 starts to open near the end of the exhaust stroke. Viewing FIG. 1, this allows the piston 20, in its upward exhaust stroke, to push a small amount of the exhaust gases back into the intake duct 12. On the subsequent (downward) intake stroke, this exhaust gas is then re-ingested into the cylinder 13 for combustion with the fuel-air mixture. By advancing the closing of the intake valve 18, the intake valve 18 closes earlier in the compression stroke. This means that less of the fuel-air mixture is pushed back into the intake duct 12, thereby enabling more power to be produced during combustion.

The benefits of intake cam phasing are well known. First, it reduces $NO_x$ emissions. This is due to what is referred to as increased residual dilution. The re-ingested exhaust gases (i.e., the diluent) lowers the temperature at which combustion occurs, thereby reducing the amount of $NO_x$ emissions. The extent of the $NO_x$ reduction depends on the load and speed of the engine. Second, it reduces HC emissions. The last portion of the exhaust gases ejected from cylinder 13 during the exhaust stroke is rich in unburned HC. It is this portion of the exhaust gases that is re-ingested during the intake stroke and subsequently burned. Advanced intake cam timing also increases the torque output by the engine at medium to high speeds, improves fuel economy and enables the engine to be operated more stably at idle.

It is also well known that use of a VCT mechanism on only the exhaust camshaft 81 has a significant effect on emissions. This involves varying the close/open timing of the exhaust valve 21, as compared to standard cam timing, when the engine 1 is operating at part load. For example, by delaying the closing of the exhaust valve 21, the valve overlap is extended into the intake stroke. This means that the exhaust valve 21 stays open at the start of the intake stroke. Viewing FIG. 1, this allows the piston 20, in its downward intake stroke, to draw a small amount of the exhaust gases from the exhaust manifold 25 not only back into the cylinder 13 but also into the intake duct 12 due to vacuum. Along with the fuel-air mixture, this exhaust gas is then burned in the combustion chamber 19 during the combustion cycle.

The benefits of exhaust cam phasing are well known. First, it also reduces $NO_x$ emissions due to increased residual dilution. Second, HC emissions are reduced because the HC-rich portion of the exhaust gases is drawn back into the cylinder 13. Delayed exhaust cam timing also improves fuel economy and enables the engine to be operated more stably at idle. In addition, exhaust cam phasing can be used as a substitute for an external exhaust gas recirculation (EGR) system, as it performs the same function. The cost of equipping a vehicle with an exhaust cam phaser can be less than that for a conventional EGR system.

U.S. Pat. No. 5,713,317 to Yoshioka describes a method of controlling a VCT mechanism through which to vary the open/close timing of a valve. It purports to optimize the valve timing so as to improve the output of the engine at high altitudes while it is operating under high loads. It also purports to reduce the fuel consumption and emissions of the engine at high altitudes as it operates under low to medium loads. The method essentially controls the amount of residual dilution (i.e., re-ingested exhaust gases). In doing so, the Yoshioka reference teaches advance of the intake valve only, in a way that attempts to compensate for the effects of altitude.

U.S. Pat. No. 5,755,202 to Stefanopoulou et al. teaches the use of a Dual Equal VCT strategy on a vehicle equipped with ETC and a torque based engine control system. According to the method, the range of torque that can be demanded of the engine is divided into five regions, namely, negligible, small, moderate, high and maximum. The engine control system chooses the particular cam timing schedule to use according to the region into which the actual torque demand falls. For example, in the negligible torque region, standard cam timing is used to maintain the engine at, a stable idle. In the small torque region, the timing scheme falls between standard and fully retarded cam phasing, with the exact timing dependent on the magnitude of the torque demand. In the moderate torque region, fully retarded cam timing is used, and the throttle position is adjusted to meet the torque demand. It is in this region that the benefits of VCT (e.g., reduced feed gas ($NO_x$ and HC) emissions and improved fuel economy) are most fully realized. In the high torque region, the timing scheme falls between fully retarded and standard cam phasing, with the exact timing dependent on the magnitude of the torque demand. Here, the throttle position is held constant. It is in this region that the cam scheduling is relaxed to best meet the torque demand. In the maximum torque region, the schedule reverts to standard cam timing. This enables the engine control system to satisfy the torque demanded by the driver.

The disadvantage of the Stefanopoulou et al. system lies in the way it selects the cam timing mode according to the region into which the actual torque demand falls. Such transitions between modes can lead not only to discontinuities during throttle transient maneuvers but also to increased calibration time. It is therefore desirable to devise a strategy that employs variable cam timing in a way that assures smoother transitions in torque while achieving even lower feed gas emissions and increased torque.

OBJECTIVES OF THE INVENTION

It is, therefore, an objective of the invention to provide a method of varying the phasing of either the intake valves or the exhaust valves or both to yield smooth transitions in torque while achieving low feed gas emissions and increased torque.

Another objective is to provide a method of using variable cam timing on an engine equipped with electronic throttle control to vary the phasing of the intake and/or exhaust valves to achieve lower feed gas emissions and improved fuel economy while delivering as closely as possible the desired torque.

A further objective is to provide a method of adjusting the position of the throttle valve, the amount of fuel injected by the fuel injector(s), the timing of the spark and the phasing of the intake and/or exhaust cams to deliver the desired torque according to the conditions under which the vehicle is operating.

Still another objective is to enable an internal combustion engine of a motor vehicle to adjust automatically the torque output by the engine in response to variations in accessory loads.

Yet another objective is to enable an internal combustion engine to meet regulations governing feed gas emissions without the use of an external exhaust gas recirculation (EGR) system.

An additional objective is to enable an engine to operate more efficiently over a wider range of torque levels.

Another objective is to enable an engine to operate at lower combustion temperatures, as compared to most prior art engines.

A further objective is to embody the valve timing algorithms for an engine in a ROM, PROM or other type of memory chip and thereby make it easy to update the valve timing schedule merely by removing the old chip from the ECM and replacing it with a new chip in which the new algorithms are stored.

In addition to the objectives and advantages listed above, various other objectives and advantages of the invention will become more readily apparent to persons skilled in the relevant art from a reading of the other sections of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

In a preferred embodiment in which an air-lead strategy is employed, the invention provides a method of improving the operating characteristics of an internal combustion engine equipped with an electronically controlled throttle, a fuel injector and a variable valve timing mechanism. The variable valve timing mechanism is used to control the timing of the intake valves and/or the exhaust valves. The method includes the repeated performance of at least the following steps. The desired torque requested of the engine is ascertained. The actual air mass flow into the intake manifold is determined based on at least one of the following variables: the absolute pressure in the intake manifold, the indicated mean effective pressure in the intake manifold, the speed of the engine, the intake air temperature, the coolant temperature, the barometric pressure, the input from a mass air flow sensor and the volumetric efficiency of the engine. The desired fuel flow is calculated based on at least the actual air mass flow according to a desired air-fuel ratio. The per-cylinder fuel amount is determined based on the desired fuel flow and the number of cylinders in the engine. The injector pulse width with which to activate the fuel injector is calculated based on the per-cylinder fuel amount. The desired air flow is calculated based on the desired fuel flow according to the desired air-fuel ratio. The actual position of the throttle is monitored. The desired position of the throttle is determined as a function of at least two of the following variables: the desired air flow, the absolute pressure in the intake manifold, the engine speed and the volumetric efficiency of the engine. The throttle is adjusted to the desired position with regard to the actual position of the throttle. The desired position for the variable valve timing mechanism is determined as a function of at least the speed of the engine and the load of the engine. The variable valve timing mechanism is directed to move to the desired position. This causes the timing at which the intake and/or exhaust valves open and close to operate according to a schedule that improves the operating characteristics of the engine. The actual position of the variable valve timing mechanism is monitored. The volumetric efficiency is determined as a function of the speed and load of the engine and one of the desired and actual positions of the variable valve timing mechanism. The dilution occurring within the cylinders is calculated based on the engine speed, the load of the engine and one of the desired and actual positions of the variable valve timing mechanism.

In an alternative embodiment in which a fuel-lead strategy is employed, the method includes the repeated performance of at least the following steps. The desired torque requested of the engine is ascertained. The desired fuel flow is calculated based not only on an amount necessary for the engine to provide the desired torque but also on the dilution occurring within the cylinders. The per-cylinder fuel amount is determined based on the desired fuel flow and the number of cylinders in the engine. The injector pulse width with which to activate the fuel injector is calculated based on the per-cylinder fuel amount. The desired air flow is calculated based on the desired fuel flow according to a desired air-fuel ratio. The actual position of the throttle is monitored. The desired position of the throttle is determined as a function of at least two of the following variables: the desired air flow, the absolute pressure in the intake manifold, the engine speed and the volumetric efficiency. The throttle is adjusted to the desired position with regard to the actual position of the throttle. The desired position for the variable valve timing mechanism is determined as a function of at least the engine speed and the engine load. The variable valve timing mechanism is directed to move to the desired position. This causes the timing at which the intake and/or exhaust valves open and close to operate according to a schedule that improves the operating characteristics of the engine. The actual position of the variable valve timing mechanism is monitored. The volumetric efficiency is determined as a function of the speed and load of the engine and one of the desired and actual positions of the variable valve timing mechanism. The dilution occurring within the cylinders is calculated based on the engine speed, the engine load and one of the desired and actual positions of the variable valve timing mechanism.

BRIEF DESCRIPTION OF THE DRAWINGS

FIG. 6 is a table of values of intake cam phaser position in which each value is a function of engine speed and engine load.

DETAILED DESCRIPTION OF THE INVENTION

Figure 1:
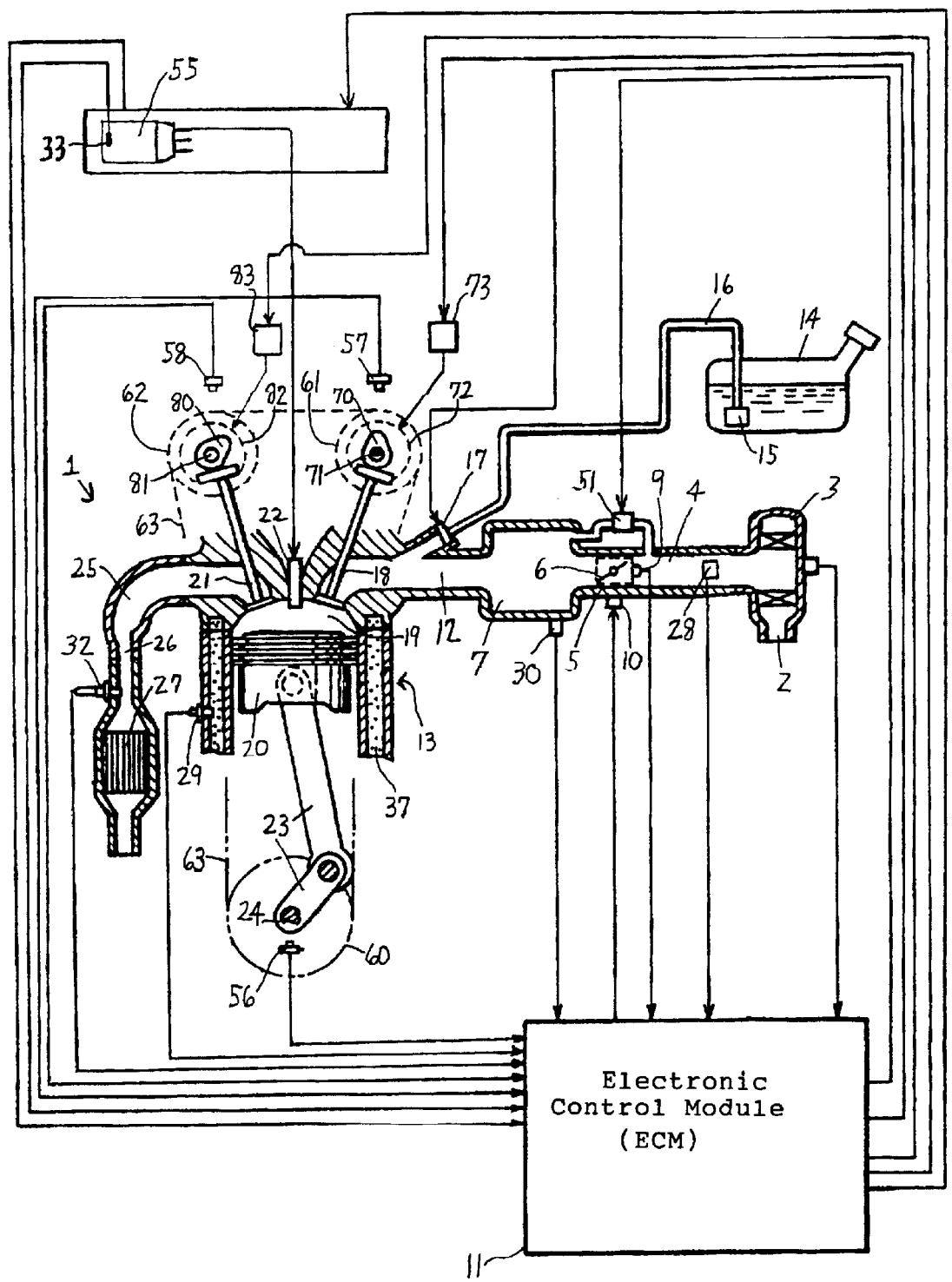
FIG. 1 is a diagram of one cylinder of an electronically controlled multi-cylinder engine showing various associated components such as the throttle body, the fuel injector, the spark timing system, the intake and exhaust valley, the variable cam timing (VCT) apparatus and the electronic control module (ECM).
Figure 2:
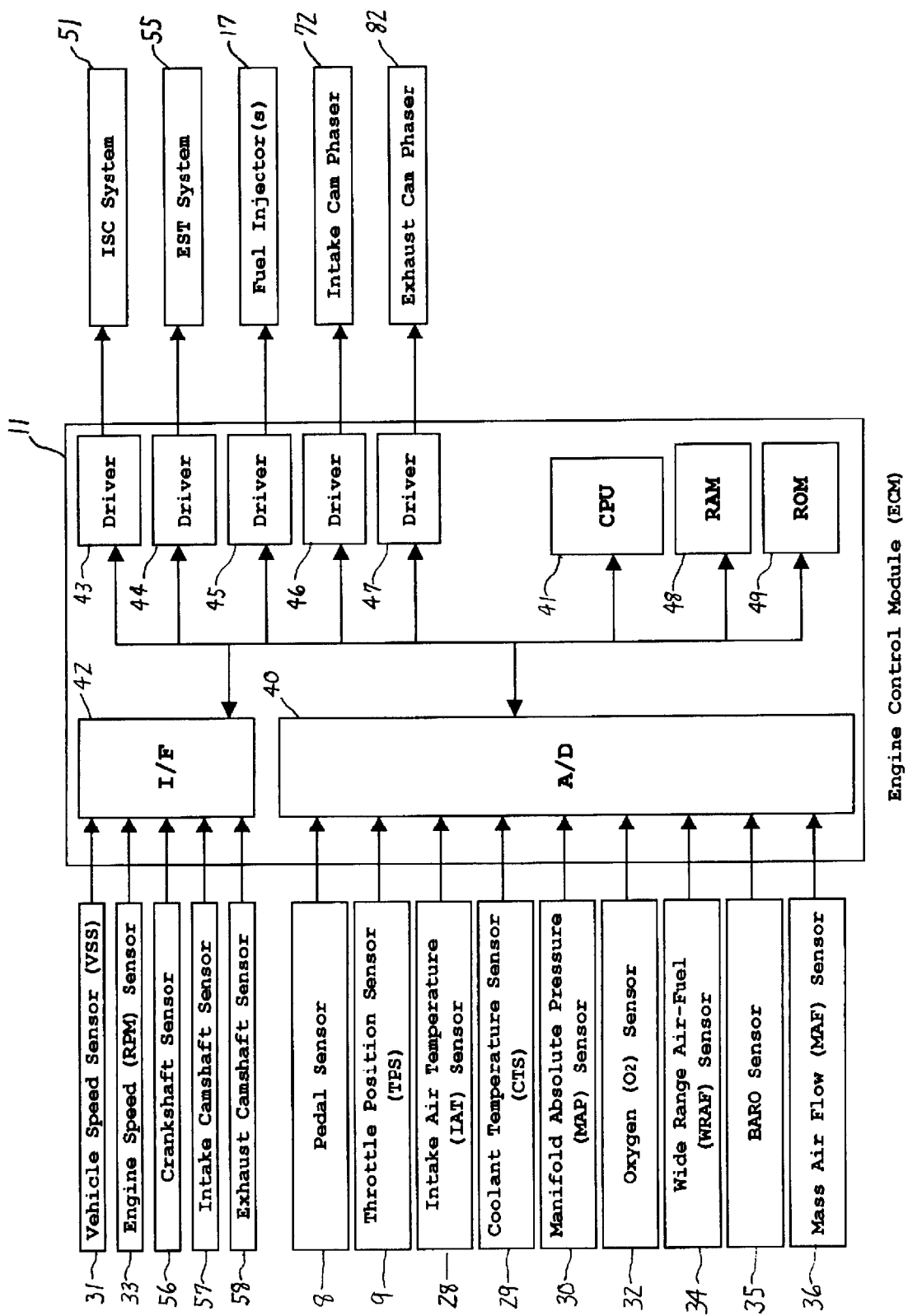
FIG. 2 is a diagram of the internal architecture of the ECM shown in FIG. 1, showing the various sensors from which it receives data and the various external devices under its control.
Figure 3:
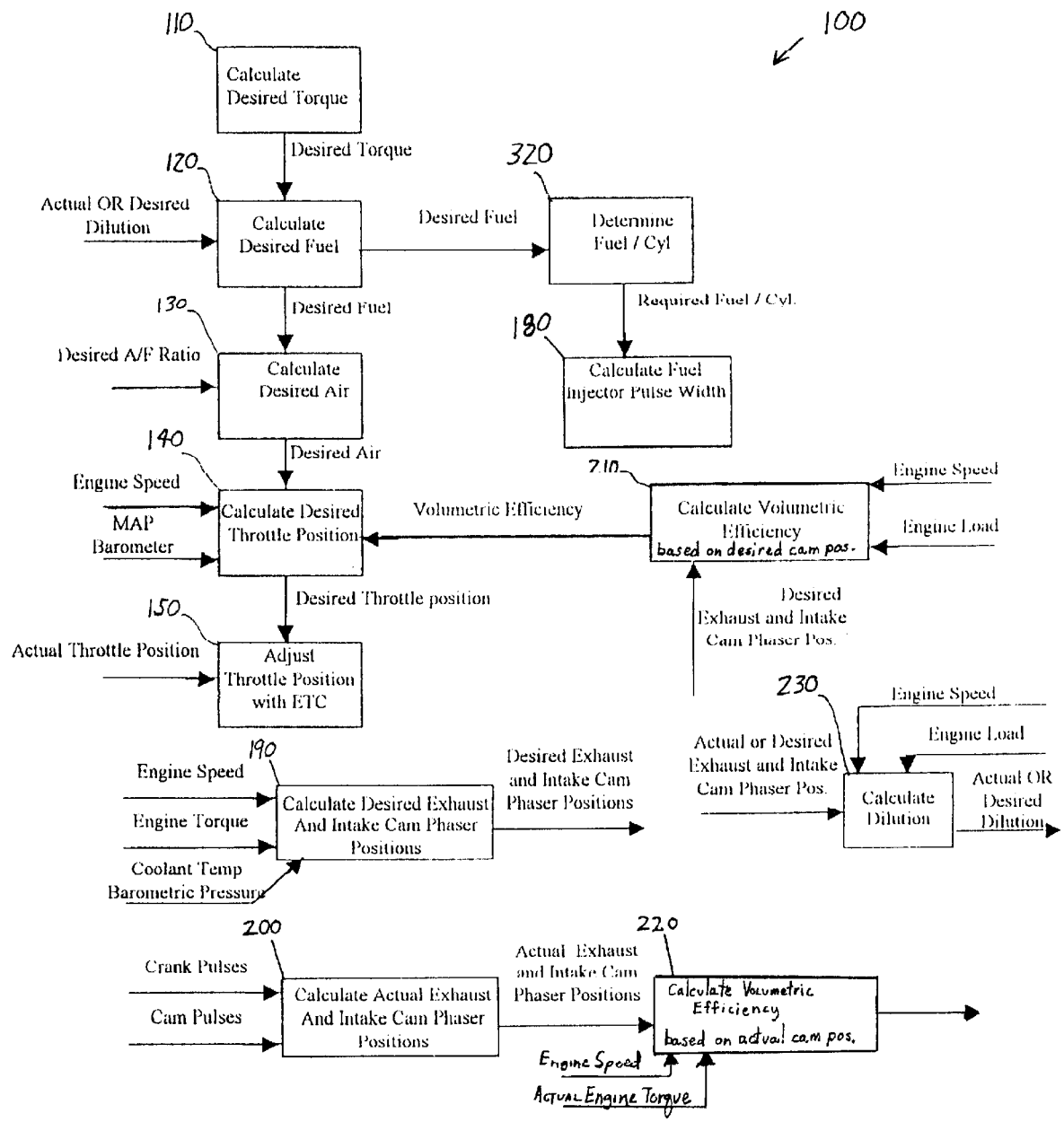
FIG. 3 is a flowchart of a method, according to the invention, through which the operating characteristics of an engine are improved using a fuel-lead strategy.
Figure 4:
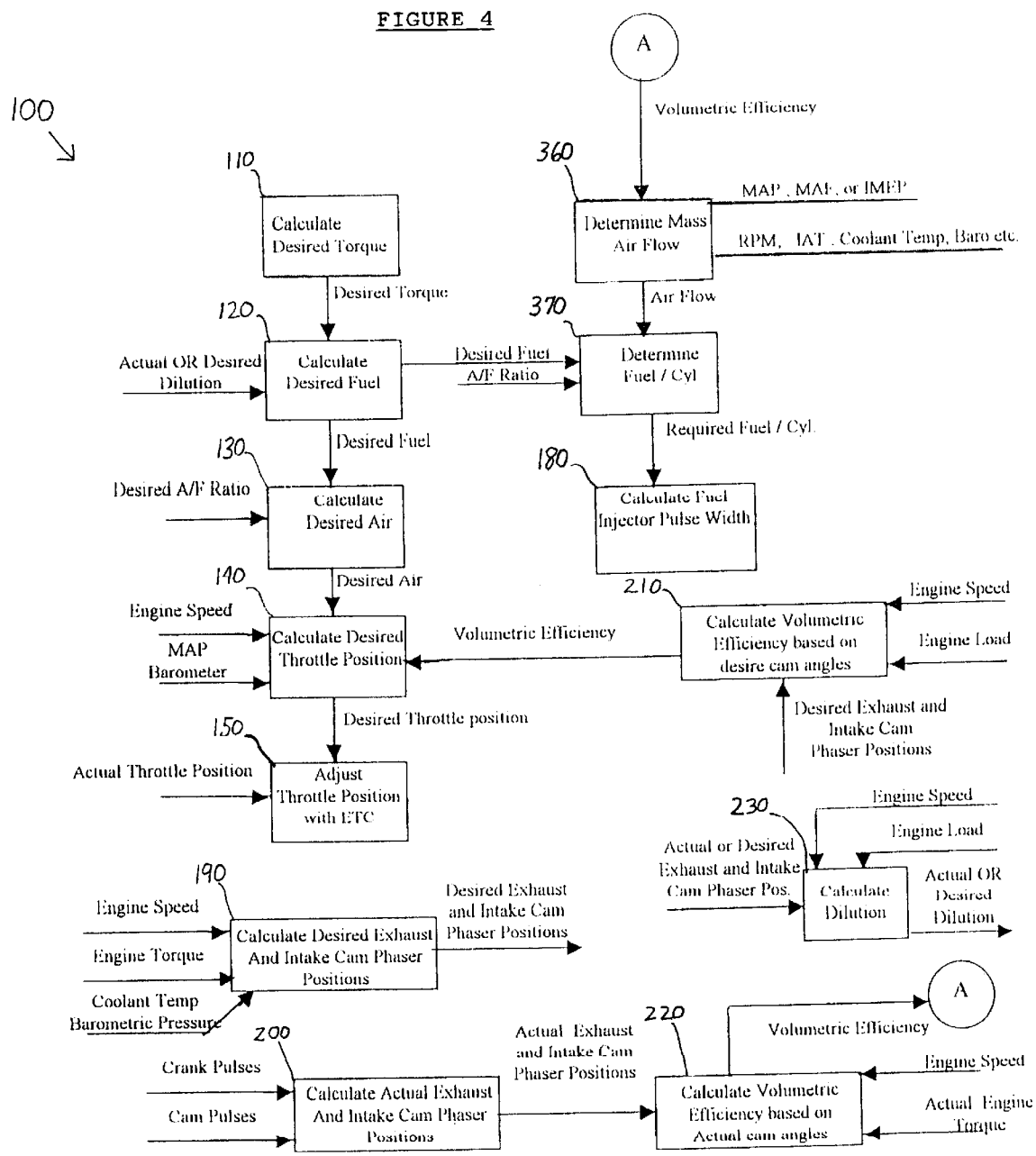
FIG. 4 is a flowchart of the method, according to the invention, through which the operating characteristics of an engine are improved using an air-lead strategy.

FIGS. 3 and 4 illustrate in flowchart form two embodiments of the invention, namely, a method that can be used to improve the operating characteristics of an internal combustion engine. More specifically, the method enables the phasing of the intake and/or exhaust valves to be varied so as to achieve lower feed gas emissions, improved fuel economy and greater stability at idle, while improving the ability of the engine to deliver the desired torque. The method, generally designated 100, is designed for a torque based control system of the type used to control an engine equipped with electronic throttle control (ETC) and a cam phaser on either the intake camshaft or the exhaust camshaft or both.

FIG. 3 depicts one embodiment of the invention, namely, using the method to implement a fuel-lead strategy. FIG. 4 illustrates the presently preferred embodiment, i.e., using the: method to implement an air-lead strategy. In either embodiment, the method 100 comprises a series of generalized steps. Using known techniques, a person of ordinary skill in the programming arts has the expertise to reduce the method to a corresponding set of instructions and to incorporate those instructions within the programming code normally executed by the control system for the engine. It should be apparent that the method could be carried out by a subroutine that is called and executed at frequent, predetermined time intervals. All steps of the invention need not necessarily be carried out in the order shown or described.

The invention is described below as if intended for the environment set out in the background section of this document. Nevertheless, it should be apparent from a reading of this document that the invention may be implemented in a variety of engine control systems, even ones unrelated to the automotive industry. The invention is presented in this context not to limit the scope of the claims set forth below but merely to simplify the description, and thus the understanding, of the invention.

Figure 5:
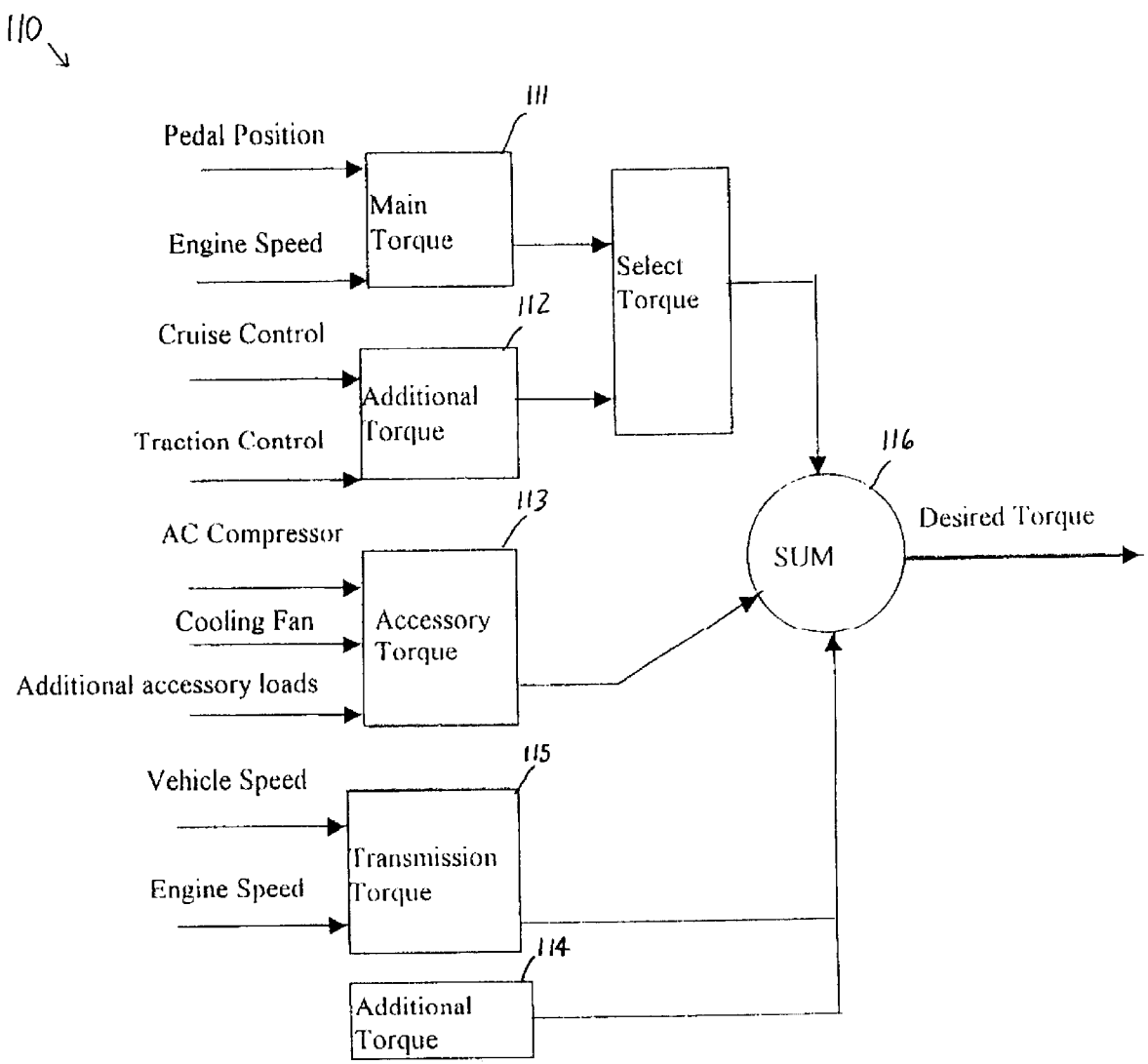
FIG. 5 is depicts a process of ascertaining the amount of torque demanded by the driver and by the conditions under which the vehicle is operating.

In either embodiment, step 110 of the method 100 involves ascertaining the desired torque, i.e., the amount of torque demanded by the driver and by the conditions under which the vehicle is operating. In a torque based engine control system, the ECM 11 can derive the desired torque generally according to the process depicted in FIG. 5. As indicated by block 111, the ECM 11 determines the amount of torque sought by the driver using the pedal, TPS and RPM sensors 8, 9 and 33 as well as other inputs. In its torque calculations, the ECM 11 also adds the torque demands of the onboard cruise control and traction control systems, if any, as shown in block 112. The ECM 11 also includes the torque lost to various other loads and accessories (e.g., the AC compressor, cooling fan, alternator/generator, etc), as suggested by blocks 113 and 114. Block 115 reveals that the ECM 11 also uses the VSS and RPM sensors 31 and 33 to ascertain the torque lost to the transmission, the amount of the loss being dependent on the gear in which the transmission is then operating. In calculating the desired torque in block 116, the ECM 11 will thus preferably be programmed to compensate not only for the torque inevitably lost to friction but also for the torque lost to additional loads. Optionally, the desired torque could be calculated without compensating for one or more of the aforementioned torque losses.

As the description below indicates, some of the other steps of the method 100 depend on whether the engine is being controlled according to the fuel-lead strategy or the air-lead strategy.

FIG. 3 illustrates the embodiment of the method 100 in which the fuel-lead strategy is realized. It is preferred that the fuel-lead strategy be implemented so that the engine 1 is operated in a lean mode. Because of the excess oxygen during lean operation, the production of carbon monoxide (CO) will be greatly reduced. It is preferred that the engine 1 be operated sufficiently lean with the combustion temperature reduced so as to lower the amount of nitrogen oxides that are produced.

Step 120 involves calculating the desired fuel flow, i.e., the amount of fuel that is deemed necessary to provide the desired torque. Using the desired torque and data from various sensors though which it receives feedback concerning the operating conditions of the engine 1, the ECM 11 determines the desired fuel flow. In doing so, however, the ECM 11 also takes into account the residual dilution. As explained further below, this parameter may be either the actual amount of dilution currently occurring within the cylinders by virtue of the intake and/or exhaust valves 18 and 21 or the desired amount of dilution. It should be apparent that the desired fuel flow is a quantity that is dependent on, inter alia, the displacement of and the number of cylinders within the engine 1. The use of such constants and other variables in the programming arts is, of course, well known in the automotive industry.

Step 130 involves calculating the desired air flow. For the fuel-lead strategy, the desired amount of air is determined using the desired fuel flow previously calculated in step 120. In particular, this calculation can be expressed by the equation:

DesiredAirFlow=DesiredAir-FuelRatio/DesiredFuelFlow where the desired air-fuel ratio is a known parameter.

Step 140 represents calculation of the desired throttle position, i.e., the position of throttle plate 6 that corresponds to desired air flow calculated in step 130. Using the desired air flow and current operating conditions such as those obtained from the MAP sensor 30, RPM sensor 33 and, if available, BARO sensor 35, the ECM 11 determines the desired throttle position. The ECM 11 also takes into account the volumetric efficiency of the engine, as explained further below. In determining the desired throttle position, the ECM 11 will preferably use a lookup table. The use of such lookup tables is well known in the programming arts. This lookup table will contain an array of throttle position values as a function of at least two variables, such as the desired air flow, the manifold absolute pressure, the engine speed and, optionally, barometric pressure. This relationship is characterized by the equation:

DesiredThrottlePosition=$f$(DesiredAirFlow,MAP,RPM,etc.).

Operating according to the algorithms into which the method is incorporated, the ECM 11 will regularly select from this table the value of desired throttle position that corresponds to the desired air flow and the current operating conditions.

As it moves the throttle plate 6 to the desired throttle position via the ETC system, the ECM 11 regularly receives feedback from the TPS sensor 9 as to the actual throttle position. Step 150 shows that the ECM 11 uses this feedback to adjust the position of the throttle plate 6 according to the method 100.

Step 320 involves determining the amount of fuel that is required on a per cylinder basis by using the desired fuel flow that was calculated in step 120. This is a simple calculation based on the number of cylinders in the engine 1. Using the required fuel per cylinder, the ECM 11 then determines the corresponding injector pulse width, the signal that is used to activate each injector(s) 17 according to the timing sequence. This is represented by step 180.

In a DOHC engine in which each -camshaft is equipped with a continuously variable cam timing mechanism, step 130 pertains to the calculation of the desired positions for both the intake and exhaust cam phasers 72 and 82. Consider first the intake valves. Using the current operating conditions such as those indicative of engine load and those obtained from the CTS sensor 29, RPM sensor 33 and, if available, BARO sensor 35, the ECM 11 determines the desired position for the intake cam phaser 72. This relationship is characterized by the equation:

DesiredIntakeCamPosition=$f$(EngineSpeed, EngineLoad)*$f$(CoolantTemp)*$f$(BarometricPressEngineLoad).

The current engine load can be calculated according to known practice from the TPS sensor 9, the MAP sensor 30, the indicated mean effective pressure (IMEP) in the intake manifold 7, engine torque, and, if available, MAF sensor 36. IMEP is a measure of engine load, one that can be ascertained according to well known practice. (It should be noted that engine load is a parameter that is engine/calibration specific. Based on the delays inherent to engine control systems, instabilities could occur in some engine configurations if the actual, rather than desired, engine load is used. This is due to the effect that cam phasing has on engine load.)

In determining the desired intake cam phaser position, the ECM 11 will preferably use a lookup table. Thin lookup table will contain an array of values of intake cam phaser position as a function of at least two variables, such as engine speed and engine load. FIG. 6 illustrates an example of such a lookup table. Engine load values are listed vertically at left, and engine speed values are listed horizontally at the top of the table. The engine load values are expressed in terms of manifold absolute pressure, IMEP, and engine torque as a percentage of the torque that would be obtainable at wide open throttle (WOT). In the body of the table, the values of intake cam phaser position are expressed in degrees of advance. According to its algorithms, the ECM 11 will regularly select from this table the value of intake cam phaser position that most closely corresponds to the current engine speed and load conditions. For improved accuracy, interpolation between table values will preferably be employed.

Figure 7:
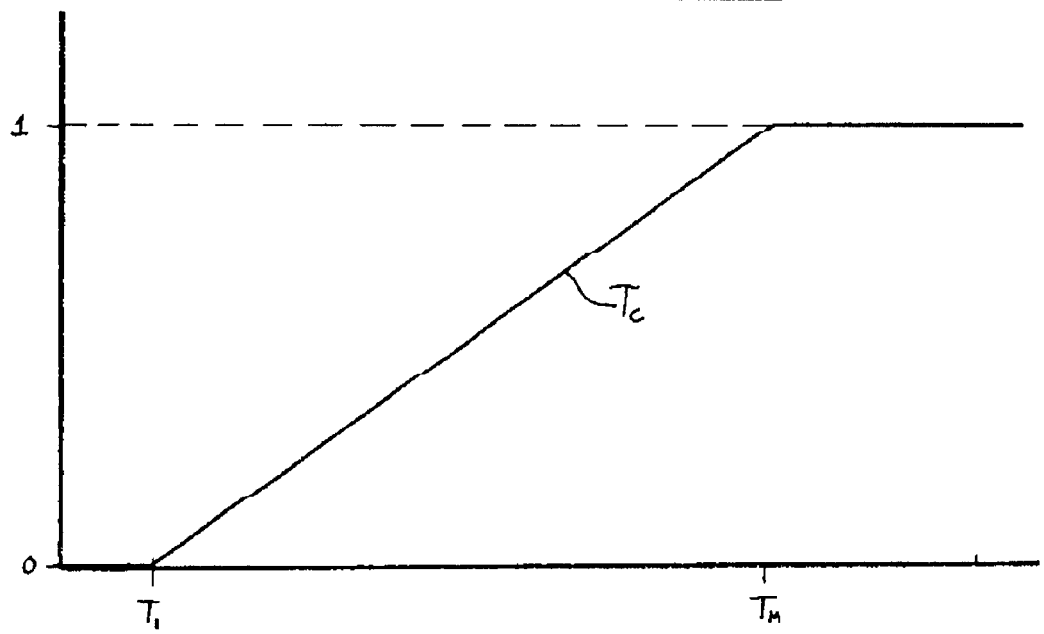
FIG. 7 is a graph of a temperature-correction curve $T_C$ whose values are plotted against engine temperature on the horizontal axis and the correction factor on the vertical axis.

The desired value of intake cam phaser position will preferably be corrected to accommodate the effects of engine temperature and atmospheric pressure. FIG. 7 illustrates an example of a temperature-correction curve $T_c$. It is plotted against engine temperature on the horizontal axis and against the correction factor on the vertical axis. It increases monotonically, preferably linearly, until temperature $T_M$ is reached, at which point the curve $T_c$ has its maximum value, unity. When the temperature of the engine 1 id less than or equal to temperature $T_1$, intake cam phasing is not desired. When the engine temperature lies above $T_1$, temperature-correction is required. The desired intake cam phaser position is then made equal to the value obtained from the table lookup multiplied by the temperature-correction value taken from curve $T_c$. It is presently preferred that the minimum temperature ($T_1$) be approximately 20° C. and that the maximum temperature ($T_M$) be about 110° C.

Figure 8:
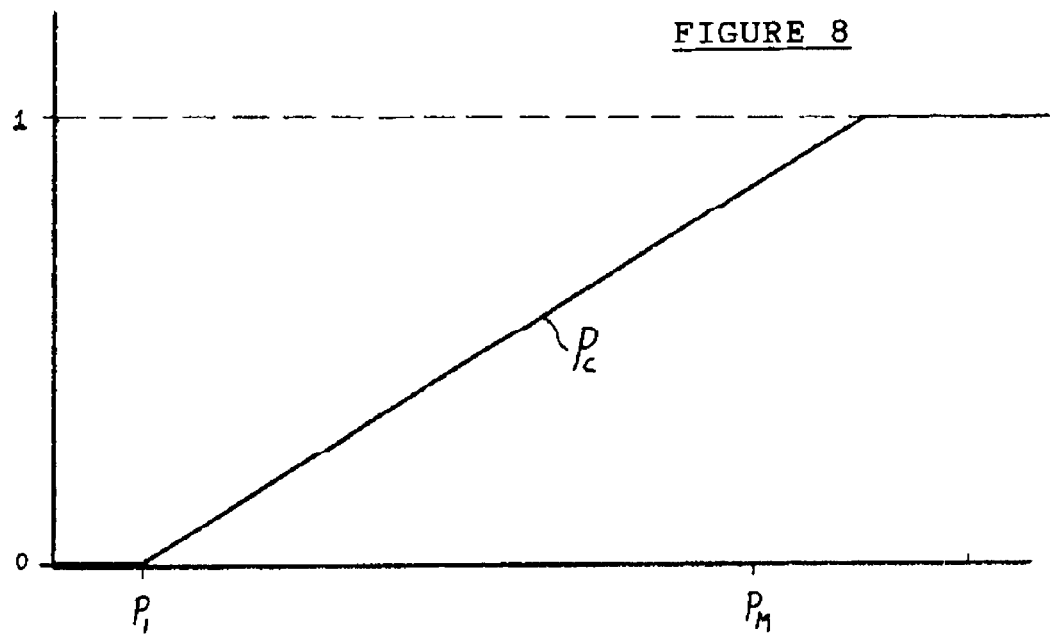
FIG. 8 is a graph of a pressure-correction curve $P_c$ whose values are plotted against ambient pressure on the horizontal axis and the correction factor on the vertical axis.

FIG. 8 illustrates an example of a pressure-correction curve $P_c$. It is plotted against ambient pressure on the horizontal axis and against the correction factor on the vertical axis. It increases monotonically, preferably linearly, until pressure $P_M$ is reached, at which point the curve $P_c$ has its maximum value, unity. When atmospheric pressure is less than or equal to pressure $P_1$, intake cam phasing is not desired. When the pressure lies above $P_1$, pressure-correction is required. The desired intake cam phaser position is then made equal to the value obtained from the table lookup multiplied not only by the temperature-correction value taken from curve $T_c$ but also by the pressure-correction value taken from curve $P_c$. It is preferred t-hat the minimum pressure ($P_1$) be approximately 80 KPa and that the maximum pressure ($P_M$) be about 105 KPa. The purpose of this correction is to eliminate or reduce cam phasing when the engine is operated at high altitudes or while atmospheric pressure is reduced due to weather.

Once it calculates the desired value of intake cam position, the ECM 11 directs the intake cam phaser 72 through drive circuit 46 to alter the angular relationship between the intake camshaft 71 and the crankshaft 24 accordingly. In doing so, the ECM 11 adjusts the open/close timing of the intake valves 18, and thereby enables the engine 1 to obtain the desired operating characteristics in regards to the intake camshaft 71.

Consider now the exhaust valves. Using the current operating conditions such as those indicative of engine load and those obtained from the CTS sensor 29, RPM sensor 33 and, if available, BARO sensor 35, the ECM 11 determines the desired position for the exhaust cam phaser 82. This relationship can be expressed as:

DesiredExhaustCamPosition=$f$(EngineSpeed, EngineLoad)*$f$(CoolantTemp)*$f$(BarometricPress,EngineLoad).

Figure 9:
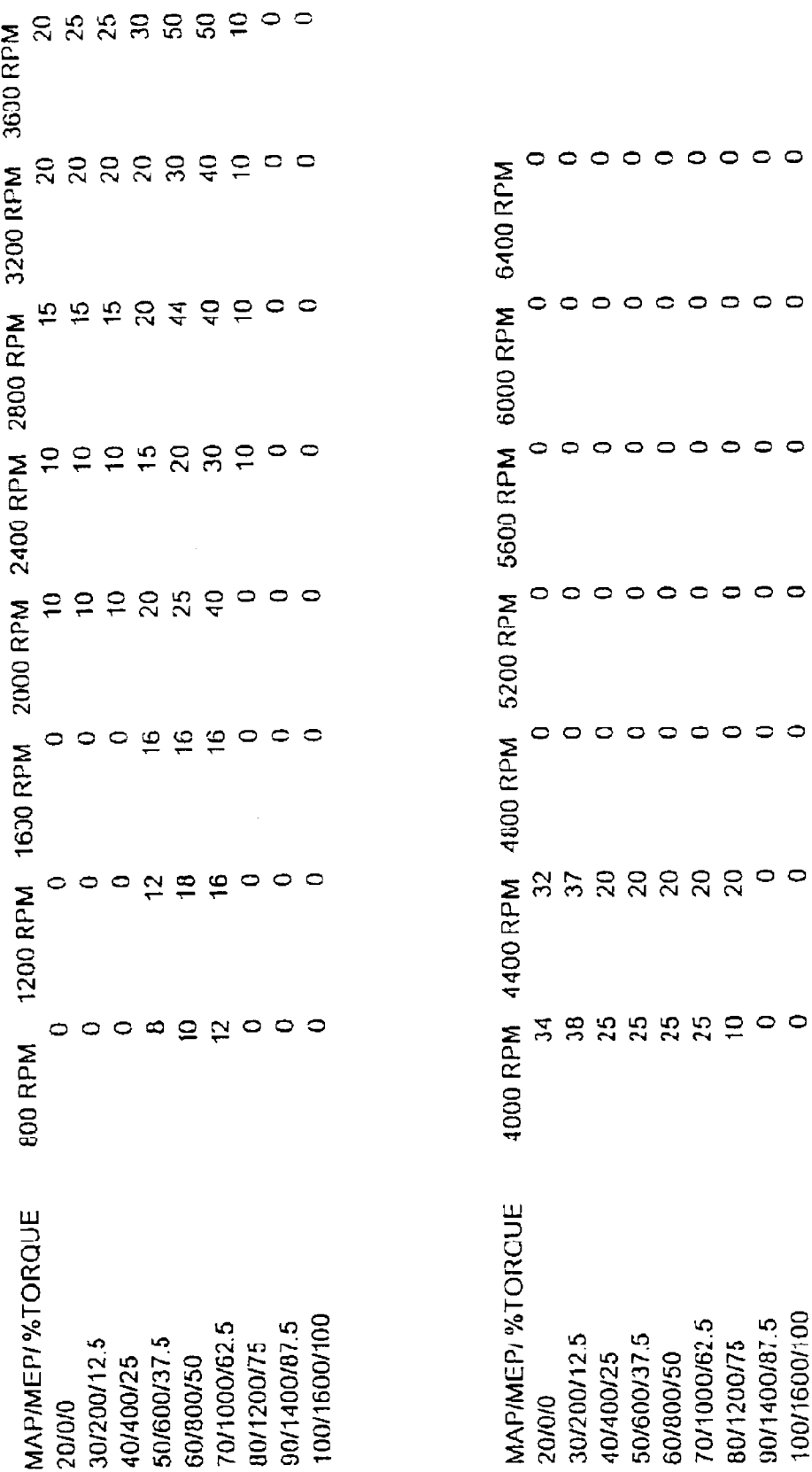
FIG. 9 is a table of values of exhaust cam phaser position in which each value is a function of engine speed and engine load.

In determining the desired exhaust cam phaser position, the ECM 11 will preferably use a lookup table. This lookup table will contain an array of values of exhaust cam phaser position as a function of at least two variables, such as engine speed and engine load. FIG. 9 illustrates such a lookup table, one similar to that used in calculation of the desired intake cam phaser position. In the body of this table, however, the values of exhaust cam phaser position are expressed in degrees of retard. According to its algorithms, the ECM 11 will regularly select from this table the value of exhaust cam phaser position that most closely corresponds to the current engine speed and load conditions. For improved accuracy, interpolation between table values will preferably be employed.

The desired value of exhaust cam phaser position will preferably be corrected to accommodate the effects of engine temperature and atmospheric pressure. Using FIGS. 7 and 8, the temperature and pressure-correction factors can be ascertained for the exhaust cam phaser 82 in the manner previously described for the intake cam phaser 72. The desired exhaust cam phaser position would then be equal to the value obtained from the table lookup multiplied by the temperature-correction value taken from curve $T_c$ and by the pressure-correction value taken from curve $P_c$.

Once it calculates the desired value of exhaust cam position, the ECM 11 directs the exhaust cam phaser 82 through drive circuit 47 to alter the angular relationship between the exhaust camshaft 81 and the crankshaft 24 accordingly. In doing so, the ECM 11 adjusts the open/close timing of the exhaust valves 21, and thereby enables the engine 1 to obtain the desired operating characteristics in regards to the exhaust camshaft 81

Step 200 involves determining the actual positions of the intake and exhaust camshafts 71 and 81. As noted earlier, the ECM 11 uses feedback from sensors 56 and 57 to monitor the angular relationship between the crankshaft 24 and the intake camshaft 71. Similarly, it uses feedback from sensors 56 and 58 to monitor the angular relationship between the exhaust camshaft 81 and crankshaft 24. It is thus through the crankshaft and camshaft sensors 56, 57 and 58 that the ECM 11 ascertains the actual positions of the intake and exhaust camshafts 71 and 81.

It is well known that a change in the positions of the intake and/or exhaust cam phasers 72 and 82 will change the volumetric efficiency of the engine 1. Consequently, step 210 involves calculating the new volumetric efficiency based on the desired positions of the camshafts. More specifically, the ECM 11 can calculate the new volumetric efficiency based on the engine speed, the engine load and the desired positions of the intake and exhaust camshafts 71 and 81. This calculation is characterized by the equation:

VolumetricEfficiency=$f$(ExhaustCamPosition,IntakeCamPosition, EngineSpeed,EngineLoad etc.).

Step 220 indicates that the POM 11 can calculate the volumetric efficiency based on the actual, rather than desired, positions of the camshafts. In this calculation, the engine load parameter is preferably derived from the actual engine torque. For the fuel-lead strategy, the desired throttle position as calculated in step 140 can be determined using the volumetric efficiency resulting from either step 210 or 220.

In either case, the volumetric efficiency will preferably be determined through use of a lookup table. This table will contain an array of values of volumetric efficiency as a function of several variables, such as the cam position(s), engine speed and engine load. According to its algorithms, the ECM 11 will regularly select from the table the value of volumetric efficiency that most closely corresponds to the current operating conditions. Interpolation may, of course, be used to improve accuracy.

Step 230 involves calculating the dilution, i.e., the extent to which the exhaust gases should be or are being re-ingested into the cylinder(s) 13. Using data obtained from the relevant sensors, the ECM 11 can determine the desired amount of dilution from the engine speed, engine load, and the desired positions of the intake and exhaust camshafts 71 and 81. The desired camshaft positions are made available by step 190. Similarly, the ECM 11 can determine the actual amount of dilution from the engine speed, engine load, and the actual positions of the intake and exhaust camshafts. The actual camshaft positions are made available by step 200. As shown in step 120, the ECM 11 compensates for the effects of the dilution in ascertaining the desired fuel flow. The ECM 11 will also compensate for the effects of the dilution in calculating the proper spark timing.

FIG. 4 depicts the preferred embodiment of the invention, namely, using the method 100 to implement the air-lead strategy. This strategy enables the engine 1 to operate in a substantially stoichiometric manner, and permits the catalytic converter 27 to operate at maximum efficiency. Operating according to this strategy, the ECM 11 tries to keep the air-fuel ratio at stoichiometry and, in doing so, overrides the fuel command. Although the throttle plate 6 takes a finite time to move to the desired position, the intake manifold 7 takes a relatively long time to draw the air past the throttle plate 6 and thus to fill. Consequently, in the air-lead strategy, step 360 involves calculating the actual amount of air that is being delivered to the cylinders (i.e., the flow of air mass into the intake manifold 7). The ECM 11 can calculate this air mass flow from the data it receives from sensors such as the MAP, RPM, IAT and CTS sensors 30, 33, 28 and 29, and, if available, the BARO and MAF sensors 35 and 36. The ECM 11 also takes into account the volumetric efficiency of the engine, as noted below. In calculating the actual air flow, the ECM 11 may also use the indicated mean effective pressure (IMEP) in the combustion chamber 19.

Based on the desired air-fuel ratio, various transient fuel effects and the actual air flow ascertained in step 360, the desired fuel flow can be calculated in step 120. In the air-lead strategy, however, the desired fuel flow will thus be the amount of fuel necessary to achieve stoichiometry. This can be calculated according to the equation:

DesiredFuelFlow≈DesiredAir–FuelRatio/ActualAirFlow.

Step 370 involves determining the amount of fuel that is required on a per cylinder basis. As with the fuel-lead strategy, this is a simple calculation using the number of cylinders in the engine 1. Using the required fuel per cylinder, the ECM 11 then determines the corresponding injector pulse width for the air-lead strategy. This is represented by step 180.

The ECM 11 regularly updates the desired throttle position according to the changing operating conditions, and moves the throttle plate 6 accordingly via the ETC system. It also monitors the actual throttle position using the feedback from the TPS sensor 9, as indicated by step 150. This enables the ECM 11 to determine the actual air flow at any given instant, according to step 360. As indicated by steps 120, 370 and 180, the ECM 11 thus regularly adjusts the injector pulse width in accordance with the actual (instantaneous) air flow.

In using the method 100 to implement the air-lead strategy, steps 190, 200, 210, 220 and 230 are performed in essentially the same way as described above in connection with the fuel-lead strategy. This includes correcting the desired values of the intake and exhaust cam phaser positions to accommodate the effects of engine temperature and atmospheric pressure. Once it calculates the desired value of intake cam position, the ECM 11 directs the intake cam phaser 72 through drive circuit 46 to alter the angular relationship between the intake camshaft 71 and the crankshaft 24 accordingly. In doing so, the ECM 11 adjusts the open/close timing of the intake valves 18, and thereby enables the engine 1 to obtain the desired operating characteristics in regards to the intake camshaft 71. Likewise, after calculating the desired value of exhaust cam position, the ECM 11 directs the exhaust cam phaser 82 through drive circuit 47 to alter the angular relationship between the exhaust camshaft 81 and crankshaft 24. By doing so, the ECM 11 adjusts the open/close timing of the exhaust valves 21, and thereby enables the engine 1 to obtain the desired operating characteristics in regards to the exhaust camshaft 81.

It is again noted that the volumetric efficiency of the engine 1 changes whenever the positions of the intake and/or exhaust cam phasers 72 and 82 change. Step 210 calculates the volumetric efficiency based on the desired positions of the intake and exhaust camshafts 71 and 81. Step 220 calculates the volumetric efficiency based on the actual positions of the camshafts. For the air-lead strategy, the desired throttle position as calculated in step 140 is preferably determined using the volumetric efficiency resulting from step 210. The air mass flow calculated in step 360, however, is preferably determined using the volumetric efficiency resulting from step 220.

In either of its embodiments, the method 100 improves the operating characteristics of the engine 1. Generally stated, whenever a change is requested in the amount of torque, the method 100 responds by adjusting the amount of fuel flow, the spark timing, the position of the throttle plate 6, and/or the positions of the intake and/or exhaust cam phasers 72 and 82 to deliver the desired torque. The method 100 adjusts those operating parameters in a way that improves the ability of the engine to deliver the desired torque, produce less feed gas emissions, idle more stably, and consume less fuel, as compared to prior art schemes.

Although the method 100 is described and depicted herein as applying to both the intake and exhaust camshafts 71 and 81, it should be apparent that it can be applied to either alone. In an Intake Only system, the ECM 11 will respond to a change in torque by adjusting the fuel flow, the air flow, the external EGR system and the position of the intake cam phaser 72 to settings that allow the engine to deliver as closely as possible the desired torque while still providing low feed gas emissions. In an Exhaust Only system, the ECM 11 will respond to a change in torque by adjusting the fuel flow, the air flow and the position of the exhaust cam phaser 82 to settings that enable the engine to deliver improved fuel economy and lower emissions while still maintaining driveability.

The invention also contemplates that the intake and exhaust valves could be electronically driven, as opposed to being camshaft driven. Consequently, the term variable valve timing encompasses both mechanically and electronically controlled valves, and may apply to the phasing of either the intake valves or the exhaust valves or both. In addition, the position of a variable valve timing mechanism may be construed to mean the position of a camshaft and its associated cams.

The presently preferred and various alternative embodiments for carrying out the invention have been set forth in detail according to the Patent Act. Persons of ordinary skill in the art to which this invention pertains may nevertheless recognize alternative ways of practicing the invention without departing from the spirit and scope of the following claims. Persons of such skill will also recognize that the foregoing description is illustrative of the invention and not intended to limit any of the ensuing claims to any particular narrow interpretation.

What is claimed is:

1. A method of improving the operating characteristics of an internal combustion engine equipped with an electronically controlled throttle, a fuel injector and a variable valve timing mechanism, said variable valve timing mechanism being used to control the timing of at least one of intake valves and exhaust valves of said engine, said method comprising the repeated performance of at least the following steps:

(a) ascertaining a desired torque requested of said engine;

(b) calculating a desired fuel flow based on an amount necessary for said engine to provide said desired torque and on dilution occurring within cylinders of said engine;

(c) determining a per-cylinder fuel amount based on said desired fuel flow and the number of said cylinders in said engine;

(d) calculating an injector pulse width with which to activate said fuel injector based on said per-cylinder fuel amount;

(e) calculating a desired air flow based on said desired fuel flow according to a desired air-fuel ratio;

(f) monitoring an actual position of said throttle;

(g) determining a desired position of said throttle as a function of at least two of said desired air flow, an absolute pressure in an intake manifold of said engine, a speed of said engine and a volumetric efficiency of said engine;

(h) adjusting said throttle to said desired position with regard to said actual position of said throttle;

(i) determining a desired position for said variable valve timing mechanism as a function of at least said speed of said engine and a load of said engine;

(j) directing said variable valve timing mechanism to move to said desired position thus causing said timing at which said at least one of said intake valves and said exhaust valves open and close to operate according to a schedule that improves said operating characteristics of said engine;

(k) monitoring an actual position of said variable valve timing mechanism;

(l) determining said volumetric efficiency of said engine as a function of said speed of said engine, said load of said engine and one of said desired and actual positions of said variable valve timing mechanism; and (m) calculating said dilution occurring within said cylinders of said engine based on said speed of said engine, said load of said engine and one of said desired and actual positions of said variable valve timing mechanism.

2. The method, as claimed in claim 1, wherein said desired position of said variable valve timing mechanism is corrected to accommodate the effects of at least one of a temperature of said engine and a barometric pressure.

3. The method, as claimed in claim 1, wherein said desired torque includes the torque demanded by an operator of said engine and the torque consumed by at least one of a transmission, a cruise control system, a traction control system and at least one of various other loads on said engine.

4. The method, as claimed in claim 1, wherein said desired position of said throttle is also a function of barometric pressure.

5. The method, as claimed in claim 1, wherein said variable valve timing mechanism includes at least one of an intake cam phaser and an exhaust cam phaser.

6. The method, as claimed in claim 5, wherein said desired position of said variable valve timing mechanism is corrected to accommodate the effects of at least one of a temperature of said engine and a barometric pressure.

7. The method, as claimed in claim 1, wherein said variable valve timing mechanism is an intake cam phaser.

8. The method, as claimed in claim 1, wherein said variable valve timing mechanism is an exhaust cam phaser.

9. The method, as claimed in claim 1, wherein said load of said engine is determined from at least one of said position of said throttle, said absolute pressure in said intake manifold, an indicated mean effective pressure in said intake manifold, actual torque of said engine and flow of air mass into said intake manifold.

10. The method, as claimed in claim 1, wherein said desired air flow is sufficient to enable said engine to operate according to a lean air-fuel mixture whereby production of carbon monoxide and nitrogen oxide(s) is minimized.

* * * * *